US012321272B2

(12) United States Patent
King (10) Patent No.: US 12,321,272 B2
(45) Date of Patent: Jun. 3, 2025

(54) PSEUDO OUT-OF-ORDER STORE COMMIT (71) Applicant: ADVANCED MICRO DEVICES, INC., Santa Clara, CA (US)

(72) Inventor: John M. King, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/127,054

(22) Filed: Mar. 28, 2023

(65) Prior Publication Data

US 2024/0330185 A1 Oct. 3, 2024

(51) Int. Cl.
*G06F 12/08* (2016.01)
*G06F 12/0815* (2016.01)
(52) U.S. Cl.
CPC .............. *G06F 12/0815* (2013.01)
(58) Field of Classification Search
CPC .................................................. G06F 12/0815
See application file for complete search history.

(56) References Cited

U.S. PATENT DOCUMENTS

| 10,949,201 | B2 | 3/2021 | Bingham et al. |
| 2005/0210203 | A1* | 9/2005 | Stenstrom ........... G06F 12/0831 711/144 |
| 2018/0267842 | A1* | 9/2018 | Gou .................... G06F 13/1663 |
| 2020/0272463 | A1* | 8/2020 | Bingham .............. G06F 9/3009 |
| 2020/0356411 | A1* | 11/2020 | Kim ........................ G06F 12/126 |
| 2022/0091987 | A1* | 3/2022 | Fryman ................. G06F 9/3834 |
| 2024/0104021 | A1* | 3/2024 | Cadigan, Jr. ......... G06F 12/0811 |

* cited by examiner

*Primary Examiner* — Masud K Khan (57) ABSTRACT

A buffer of a processing system allows younger stores to write to a data cache before an older store completes its write operation to the data cache while maintaining the appearance of committing stores in program order. To maintain the appearance that a blocked store completed its write operation to the data cache, the processing system cancels the blocked store while "locking" the cache line in the data cache in an exclusive state to which the blocked store is attempting to write. The data cache negatively acknowledges any probes to the cache line until the blocked store has completed the write operation. The buffer thus decouples completing the write operation from global observability of the write operation.

20 Claims, 5 Drawing Sheets

PSEUDO OUT-OF-ORDER STORE COMMIT

BACKGROUND

To support execution of instructions at a processor, a processing system typically includes a processor and a memory subsystem including memory modules to hold data to be accessed by the executing instructions. To facilitate processing efficiency, the memory subsystem can be organized into a memory hierarchy having main memory at the top of the hierarchy to hold all data that can be accessed by the executing instructions, and one or more caches at lower levels of the memory hierarchy to hold subsets of the data stored at main memory. In the course of executing instructions, the processor generates operations, referred to as memory access requests, to store (a write operation) or load (a read operation) data from the memory hierarchy. To facilitate memory access efficiency, write operations to the memory hierarchy are typically held temporarily in a store queue (also referred to as a write buffer) until they are ready to be processed at the memory modules of the memory hierarchy.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

A store operation writes data to memory. Store operations (also referred to herein as "stores" or "writes") are held in a store queue or write buffer that keeps track of stores that have not yet been completed. The store queue is an in-order structure such as a first-in-first-out (FIFO) buffer, where stores are put in program order and taken out in program order. Another buffer such as a store coalescing buffer (SCB) follows the store queue and gathers stores to the same address so the act of writing to cache or memory can be performed in fewer operations. For example, if four 16-byte stores in a row are all to the same 64-byte address range of memory, the SCB gathers the four stores into a single 64-byte-wide write operation to the address range. In some implementations, the stores that are gathered into a single SCB entry are not necessarily contiguous (i.e., there may be gaps between the address ranges of stores of a single SCB entry).

Some instruction set architectures, such as the x86 instruction set architecture (ISA), require stores to a data cache of the memory hierarchy to be visible to other processors or threads ("globally visible") in program order. Thus, writes to the data cache are conventionally performed in program order. In particular, stores are moved from the store queue to the SCB, which then conventionally writes the stores to the data cache in program order. An SCB typically attempts to perform one or two writes per cycle. However, if a write encounters a problem (e.g., a bank conflict) that prevents the write from completing in a given cycle, in a naive implementation in an x86 ISA context, the SCB would have to cancel that store's write operation as well as any stores younger than the canceled write operation, because the stores must be performed in program order to comply with the requirements of the x86 ISA. Thus, for example, if a store operation pipeline is six cycles long and a bank conflict occurs in cycle 4, there could be three more stores behind the store with the bank conflict, and all four stores would have to be canceled because the store in cycle 4 is unable to complete.

Correct operation of a data manipulation operation often requires that the involved data be up-to-date, or "coherent"; that is, the data stored in the memory and manipulated during the data manipulation operation reflects the most recent version of that data. In some implementations, the device requesting the data manipulation operation performs coherency operations needed to ensure that the changes to local versions of the data made by the external devices are propagated to the memory before the requesting external device sends an operation command to the memory. A cache coherency protocol may rely on probes communicated among the devices of a processing system. These probes can include, for example, snoop requests, snoop responses, and the like.

To illustrate, to determine the status of data stored at particular memory block, one device may issue a probe to one or more other devices to determine the statuses of the corresponding block in their local caches. Each device receiving the probe may assess its local cache hierarchy to determine whether a version of the data is locally cached, and if so, reply with a probe response indicating the status of the data in the local cache and, if modified by the device, a copy of the data so modified. If a probe is received while an SCB is attempting to write to a data cache, to comply with the x86 ISA, the SCB must appear to the probe to write entries to the data cache in program order.

FIGS. 1-5 illustrate techniques for allowing younger stores to complete while an older store retries while maintaining the appearance of committing stores in program order in accordance with some implementations. To maintain the appearance that a blocked store completed its write to the data cache, the processing system cancels the blocked store while "locking" the cache line in the data cache to which the blocked store is attempting to write in an exclusive state in which the cache line cannot be modified by another device by refusing to respond to (e.g., negatively acknowledging, or "NACKing") any probes to the cache line until the SCB has completed the write. The SCB thus decouples completing the write operation from observability of the write operation.

In some implementations, the SCB locks a cache line to which an SCB entry is attempting to write in an exclusive state and unlocks the cache line in response to completing the write operation. For an SCB entry that encounters no problems such as a bank conflict when attempting to write (i.e., an "unblocked" SCB entry), the corresponding cache line in the data cache is locked only briefly (e.g., for a single cycle) while the write operation completes. For an SCB entry that is blocked, the cache line remains locked in an exclusive state until the SCB entry completes its write operation, which could extend over several cycles as other (younger) SCB entries attempt to write to the data cache. During the time that the cache line is locked in an exclusive state, any probes to the cache line are refused (NACKed), thus blocking visibility of probes into any out-of-order writes to the data cache.

In some implementations, locking the cache line in an exclusive state is achieved by setting a bit in the SCB indicating that the cache line is locked. If the SCB entry is blocked from completing its write to the data cache (e.g., due to a bank conflict), in some implementations, the SCB sets a bit for the entry indicating that the entry still needs to be written to the data cache and retries the write operation in response to the bit being set. In the interim between setting the bit and retrying the write operation, the SCB may attempt to write one or more younger entries of the SCB to the data cache. Once the write operation for the blocked entry is completed, the SCB deallocates (effectively clearing the "locked" bit) and the cache line is unlocked.

Allowing entries to write to the data cache out of program order can result in coherency issues, such as an older (blocked) entry overwriting a younger entry to the same cacheline that has written ahead of the older entry. To prevent overwriting younger data with older data, in some implementations the SCB sets a succeed bit for an entry in response to the write operation of the entry completing. The SCB then broadcasts an identifier indicating the address of the data of the entry, an age of the entry, a byte mask indicating which bytes of the address were written by the entry, and the succeed bit. Pending SCB entries compare their addresses and ages to the broadcast and use the broadcast byte mask to clear their own bytemask for bytes that match the broadcast byte mask if their addresses match the broadcast address and their ages are older than the age of the broadcast. In other implementations, the SCB cancels a write operation of the younger SCB if an older SCB has not yet completed its write operation.

Figure 1:
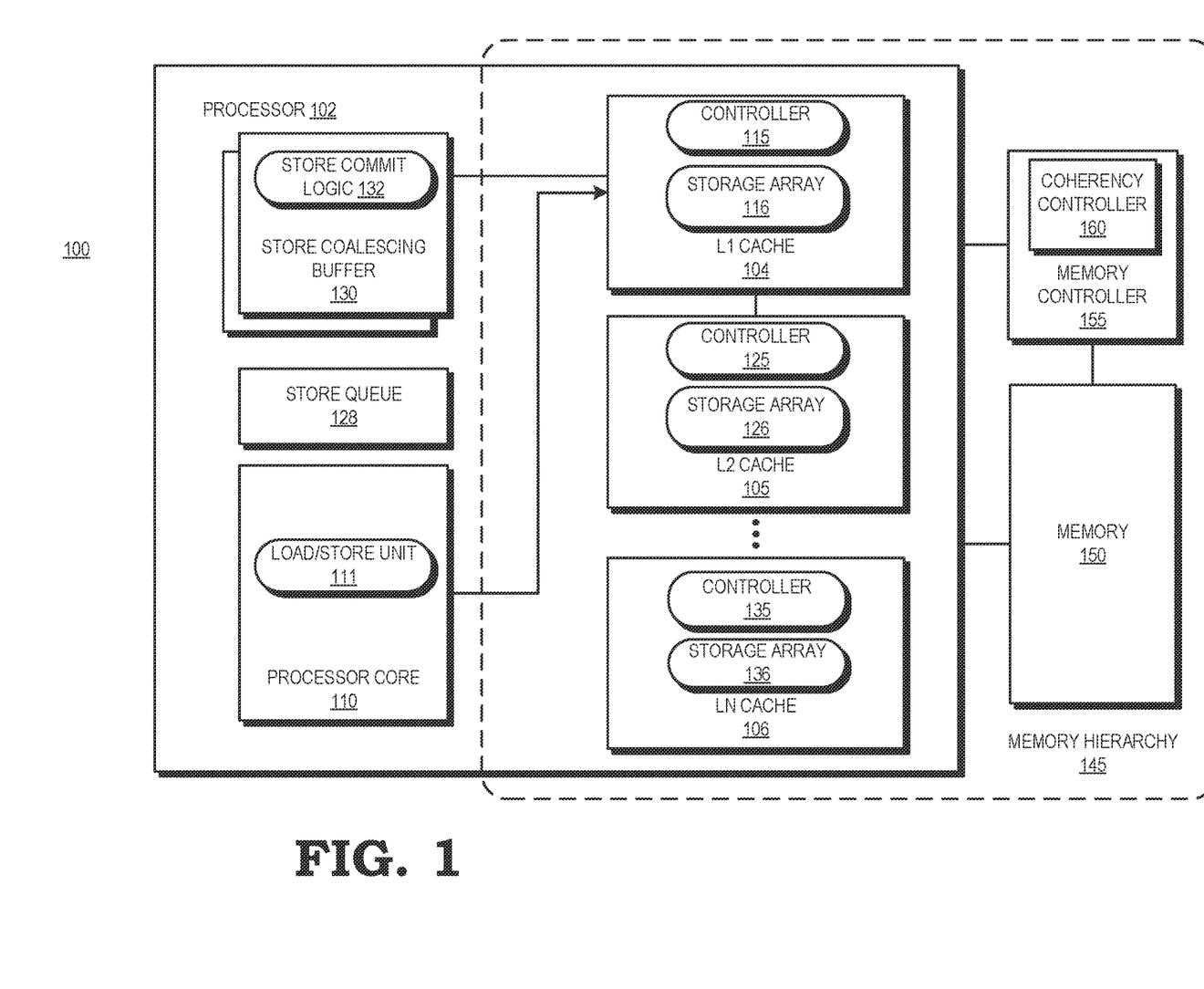
FIG. 1 is a block diagram of a processing system having a store coalescing buffer with logic to hide out-of-order store commits in accordance with some implementations.

FIG. 1 illustrates a processing system 100 configured to selectively perform pseudo out-of-order store commits in accordance with some implementations. The processing system 100 includes a processor 102 and a memory 150. The processing system 100 can be any device that employs a processor, including a personal computer, server, portable electronic device such as a cell phone, automotive device, game console, and the like. The processor 102 is generally configured to execute sets of instructions arranged as computer programs and stored at the memory 150. The sets of instructions manipulate the processor 102 in order to carry out tasks associated with the computer programs.

The processor 102 includes one or more processor cores 110 that execute the sets of instructions, only one of which is illustrated in the interest of clarity. In some implementations, the processor cores 110 implements an instruction pipeline having a plurality of stages, whereby each stage carries out particular operations as part of an instruction's execution. For example, the instruction pipeline can include a fetch stage to fetch the next instruction in a program order, a decode stage to decode fetched instructions into sets of micro-operations, a dispatch stage to dispatch the micro-operations for execution, an execution stage having a plurality of execution units to execute the dispatched micro-operations, and a retire stage to manage retirement of instructions.

The processor 102 also includes a set of N caches, where N is an integer. In the illustrated example, the N caches include a cache 104, a cache 105, and additional caches through an Nth cache 106. For purposes of discussion, it is assumed that the caches 104-106 hold data that is manipulated by the processor 102 during execution of instructions. The processor 102 can also include another set of caches arranged in a hierarchy that holds the instructions to be executed by the processor core 110. In some implementations one or more of the caches 104-106 can hold both instructions and data.

The caches 104-106 and the memory 150 together form a memory hierarchy 145 for the processing system 100. The memory 150 is located at the lowest level of the memory hierarchy 145, and the caches 104-106 are each located at a different corresponding level of the memory hierarchy 145. Thus, in the illustrated example of FIG. 1, the cache 104 is located at the highest level of the hierarchy and is therefore referred to as the L1 ("level 1") cache 104. The cache 105 is located at the next higher level in the memory hierarchy 145 and is referred to as the L2 ("level 2") cache 105. The other caches of the processor 102 are located at other levels of the memory hierarchy 145, with the cache 106 at the Nth level and referred to as LN cache 106.

In some implementations, each successively higher level of the memory hierarchy 145 is successively smaller (has a smaller capacity to hold data). Thus, for example, the L1 cache 104 capacity is smaller than the capacity of the L2 cache 105. However, the processor 102 typically accesses data from the memory hierarchy 145 via the L1 cache 104 and does not access data from other levels of the memory hierarchy 145. Accordingly, data located at lower levels of the memory hierarchy 145 is provided to the processor 102 by having the data traverse each level of the memory hierarchy 145 until it reaches the L1 cache 104. Each level the data traverses in the memory hierarchy 145 introduces additional latency in responding to an access request from the processor 102. Accordingly, the higher the level of the memory hierarchy 145 in which data requested by the processor 102 is located, the higher the processing efficiency for the data (and the lower the latency for the processor 102 receiving the data).

Each of the caches 104-106 includes a cache controller and a storage array. The storage array for each of the caches 104-106 is a set of storage elements, such as bitcells, configured to store data. The controller for each of the caches 104-106 is configured to manage the storage and retrieval of data at its corresponding storage array. In the illustrated example, the L1 cache 104 includes the controller 115 and the storage array 116, the L2 cache 105 includes the controller 125 and the storage array 126, and the LN cache 106 includes the controller 135 and the storage array 136.

Memory controller 155 provides access of processor cores 110 to memory 150. Memory controller 155 fulfills all instruction and data requests from processor cores 110 by first seeking the desired information within cache memories 104, 105, 106, and requesting the information from memory 150 if the information is not available in a cache. If a valid copy of the desired information is contained in one of cache memories 104, 105, 106, memory controller 155 accesses the information from that cache and forwards the information to the processor core 110 that originally issued the request. Depending on the specific coherency protocol supported by processing system 100, a copy of the requested information may be filled into that processor core's cache.

Coherency controller 160 responds to memory access requests initiated by processor cores 110 by broadcasting cache probes to each cache. Each cache can respond to the cache probe by identifying if the requested data is held in the respective cache, and associated status information. Memory controller 155 fulfills the original memory access request with information provided by a cache, if available, or from memory 150 if the information is not located in a cache memory.

For example, when processor core 110 needs to access information at a particular address in memory 150, coherency controller 160 broadcasts a cache probe to each of caches 104, 105, 106. This is necessary even when the information appears to be present in the cache associated with the requesting processor core, because the information may have been subsequently modified by another processor core and held in another location. Each of caches 104, 105, 106 can respond to the cache probe indicating if the requested information is present, and the status of that information. The act of responding to a cache probe can be referred to as servicing the cache probe. If memory controller 155 determines that a cache contains a valid copy of the requested information, memory controller 155 can access the information and provide it to the processor core that initially made the request. Each cache that does not contain the requested information responds to the cache probe with an indication referred to as a cache probe miss. If each of cache memories 104, 105, 106 respond to the cache probe with an indication of a cache probe miss, memory controller 155 will access the requested information from memory 150.

The processor core 110 includes a load/store unit 111 to generate memory access requests in response to particular instructions. To illustrate, in some implementations the load/store unit 111 is located at the execution stage of an instruction pipeline of the processor core 110. A decode stage of the instruction pipeline decodes the particular instructions to generate operations to retrieve data from the memory hierarchy 145 (load operations) or to write data at the memory hierarchy 145 (store operations). The load and store operations are collectively referred to herein as memory access requests. Each memory access request includes a memory address identifying a location of the data accessed by the memory access request.

In response to a memory access request, the load/store unit 111 generates a request, referred to herein as a demand request, to the memory hierarchy 145. The demand request is provided to the L1 cache 104. The controller 115 analyzes the memory address for the demand request and determines if the storage array 116 holds the data associated with the memory address. If so, the controller 115 satisfies the demand request by providing the data associated with the memory address to the load/store unit 111 if the demand request is for a load operation or by writing new data at the location corresponding to the memory address if the demand request is a store operation. If the controller 115 determines that the storage array 116 does not hold data associated with the memory address, it indicates a cache miss and provides the demand request to the L2 cache 105.

In response to the demand request, the controller 125 analyzes the memory address for the demand request and determines if the storage array 126 holds the data associated with the memory address. If so, the controller 125 provides the data to L1 cache 104 for storage at the storage array 116. The controller 115 then satisfies the demand request using the data stored at the storage array 116. If the controller 125 determines that the storage array 126 does not hold data associated with the memory address, it indicates a cache miss and provides the demand request to the cache at the next lower level of the memory hierarchy 145. The controllers at other levels of the memory hierarchy 145 perform similar operations to the controller 125 to determine if their corresponding storage array holds the data associated with the memory address. If so, they provide the data to the cache at the next higher level in the hierarchy, which in turn provides it to the next higher level cache, and so on until the data is provided to the controller 115 for storage at the storage array 116. If a cache does not hold the data associated with the memory address it indicates a cache miss and provides the demand request to the cache at the next higher level. The demand request thus traverses the memory hierarchy 145 until the data is determined to be located at a cache or until it reaches the LN cache 106. If the controller 135 determines that the storage array 136 does not hold the data associated with the memory address, it provides the memory address to the memory 150. In response, the memory 150 provides the data to the controller 135 for traversal up the memory hierarchy 145 to the L1 cache 104 in what is referred to herein as a "fill".

In some implementations, each of the L1 cache 104, L2 cache 105, and LN cache 106 have a limited number of read and write ports. In a given cycle, multiple requestors (e.g., multiple read and write pipelines) contend for the read and write ports, which can lead to conflicts. For example, in some implementations, a single write port is allocated to a bank of a cache and three operations (e.g., two stores and a fill) may be attempted in a given cycle. If two of the operations are attempting to access the same bank, a bank conflict occurs and only one of the operations completes. If a store and a fill are contending for the same bank, the fill is given priority, resulting in cancelation of the store.

To facilitate processing of store operations, the processing system 100 includes a store queue 128 and one or more store coalescing buffers (SCB) 130. The store queue 128 holds pending stores (writes) that have not yet been written to the memory hierarchy 145. Store operations flow from the store queue 128 to the SCB 130, which gathers stores to the same cache line so the act of writing to cache or memory can be performed in fewer operations. Because instruction set architectures such as the x86 ISA require stores to the caches of the memory hierarchy to be globally visible in program order, store operations from the SCB are conventionally performed in program order. However, in-order stores can exact a performance penalty, because a blocked store operation must be canceled as well as any younger stores' write operations that are also in progress. To allow for out-of-order write operations while appearing to perform writes in order, the SCB includes store commit logic circuitry 132. The store commit logic circuitry 132 locks the cache line to which an SCB 130 entry is attempting to write in an exclusive state until the write operation completes.

While the cache line is locked in the exclusive state, if a probe is sent having an address that matches the cache line, the cache negatively acknowledges (NACKs) the probe. By NACKing the probe, the store commit logic circuitry 132 prevents another agent in the system from observing the old data which has not been updated by the store. Observing this old data would violate the x86 ordering requirement. Once the write operation for a first store is successful, the store commit logic circuitry 132 unlocks the cache line from the exclusive state, and any probes having an address that matches the cache line are acknowledged by the cache. If the write operation for the first entry is unsuccessful, the store commit logic circuitry 132 sets a bit indicating that the write operation for the first entry needs to be performed (a "ready for write" bit) so that the write operation can be retried. Before the write operation for the first entry is retried, the store commit logic circuitry 132 attempts to write the next entry (a second entry) in the SCB 130 to the cache which, if successful, results in an out-of-order write to the cache. However, due to the blocked first entry having its cache line locked in an exclusive state, the first entry's failure to write is hidden from the rest of the processing system 100. The store commit logic circuitry 132 retries the write operation for the first entry in a random order with respect to other entries stored at the SCB 130 in some implementations.

In response to the write operation for the first entry succeeding, the store commit logic circuitry 132 clears the ready for write bit for the first entry. The store commit logic circuitry 132 also unlocks the cache line from the exclusive state so that probes to the cache line are serviced.

Whenever a write operation succeeds, the successful write operation broadcasts an ID for the first entry, a succeed bit, the age of the first entry, and a byte mask indicating which bytes of the cache line were modified by the first entry to pending entries of the SCB 130 (and any other SCBs in the processing system 100). In response to the broadcast, pending entries of the SCB 130 and any other SCBs in the processing system 100 determine if their address matches that of the ID for the first entry. If the address matches that of the ID for the first entry, the matching entry or entries compare their ages to the age of the first entry and their byte masks to the byte mask of the first entry. Any entries that are older than the first entry and have a byte mask matching that of the first entry clear their byte masks to avoid overwriting a younger write to the cache line.

Figure 2:
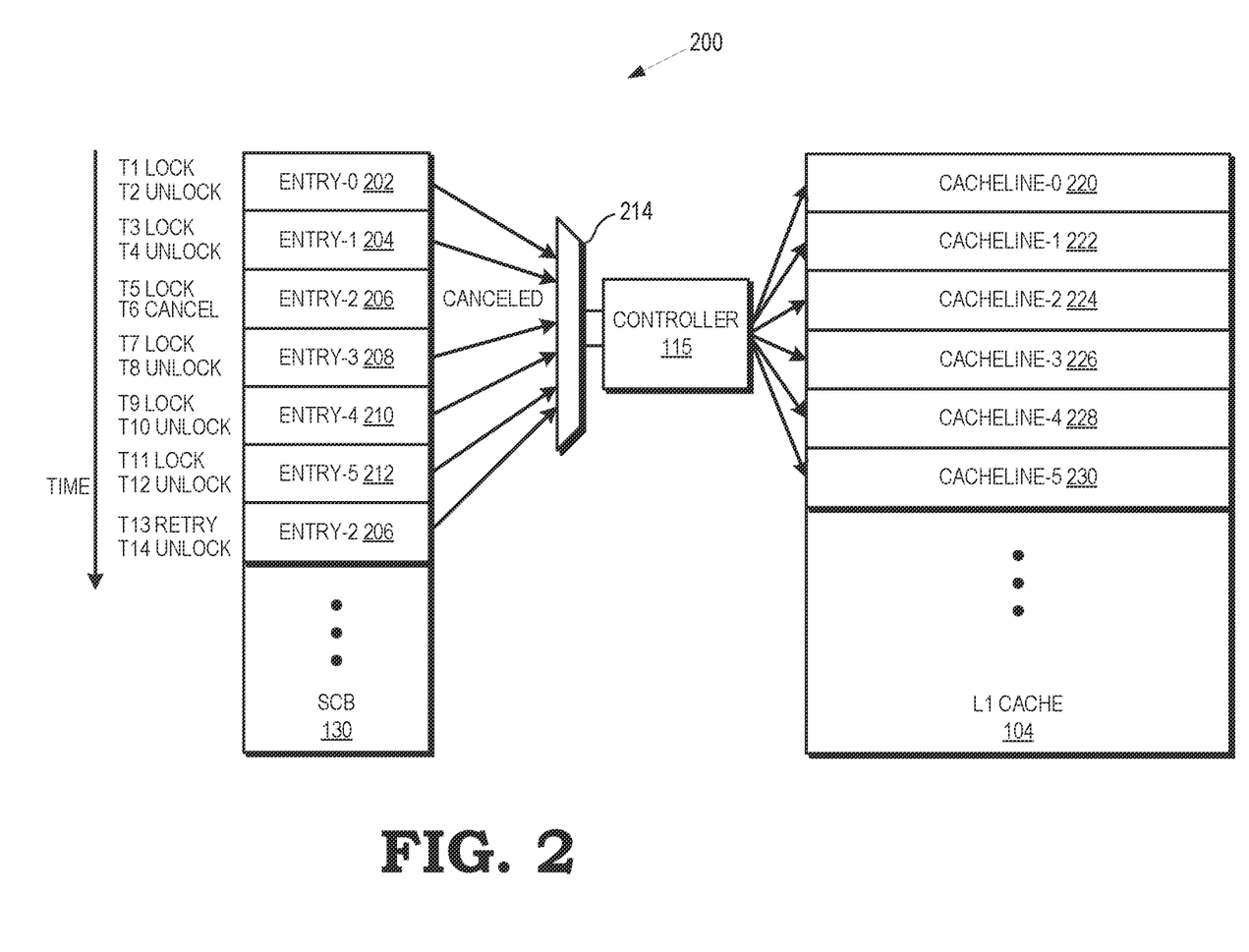
FIG. 2 is a block diagram of a store coalescing buffer writing entries out of order to a cache while appearing to write entries in order in accordance with some implementations.

FIG. 2 is a block diagram 200 of the store coalescing buffer 130 writing entries out of order to the L1 cache 104 while appearing to write entries in program order in accordance with some implementations. Attempted writes to the L1 cache are routed to a multiplexer 214, from which only a subset of the attempted writes (two, in the illustrated example) is forwarded to the L1 cache controller 115 at a time. In the illustrated example, the SCB 130 holds entry-0 202, entry-1 204, entry-2 206, entry-3 208, entry-4 210, and entry-5 212, in program order. The L1 cache 104 to which entries of the SCB 130 drain, holds cache line-0 220, cache line-1 222, cache line-2 224, cache line-3 226, cache line-4 228, and cache line-5 230.

At time T1, the store commit logic circuitry 132 locks cache line-0 220, to which entry-0 202 attempts to write. At time T2, the write operation for entry-0 202 to cache line-0 220 completes, and the store commit logic circuitry 132 unlocks cache line-0 220.

At time T3, the store commit logic circuitry 132 locks cache line-1 222, to which entry-1 204 attempts to write. At time T4, the write operation for entry-1 204 to cache line-1 222 completes, and the store commit logic circuitry 132 unlocks cache line-1 222.

At time T5, the store commit logic circuitry 132 locks cache line-2 224, to which entry-2 206 attempts to write. However, the write operation for entry-2 206 is blocked, for example due to a bank conflict, and the write operation is accordingly canceled at time T6. As a result, cache line-2 224 remains locked, such that any cache probes to cache line-2 224 are negatively acknowledged. The store commit logic circuitry 132 sets the ready to write bit for entry-2 206, and entry-2 206 remains in the SCB 130 to retry its write operation.

At time T7, while entry-2 206 remains in the SCB 130 and cache line-2 224 remains locked in an exclusive state, the store commit logic circuitry 132 locks cache line-3 226, to which entry-3 208 attempts to write. At time T8, the write operation for entry-3 208 to cache line-3 226 completes, and the store commit logic circuitry 132 unlocks cache line-3 226.

At time T9, while entry-2 206 remains in the SCB 130 and cache line-2 224 remains locked in an exclusive state, the store commit logic circuitry 132 locks cache line-4 228, to which entry-4 210 attempts to write. At time T10, the write operation for entry-4 210 to cache line-4 228 completes, and the store commit logic circuitry 132 unlocks cache line-4 228.

At time T11, while entry-2 206 remains in the SCB 130 and cache line-2 224 remains locked in an exclusive state, the store commit logic circuitry 132 locks cache line-5 230, to which entry-5 212 attempts to write. At time T12, the write operation for entry-5 212 to cache line-5 230 completes, and the store commit logic circuitry 132 unlocks cache line-5 230.

In the illustrated example, at time T13, the store commit logic circuitry 132 retries the write operation of entry-2 206 to cache line-2 224. At time T14, the write operation for entry-2 206 to cache line-2 224 completes, and the store commit logic circuitry 132 unlocks cache line-2 224.

Figure 3:
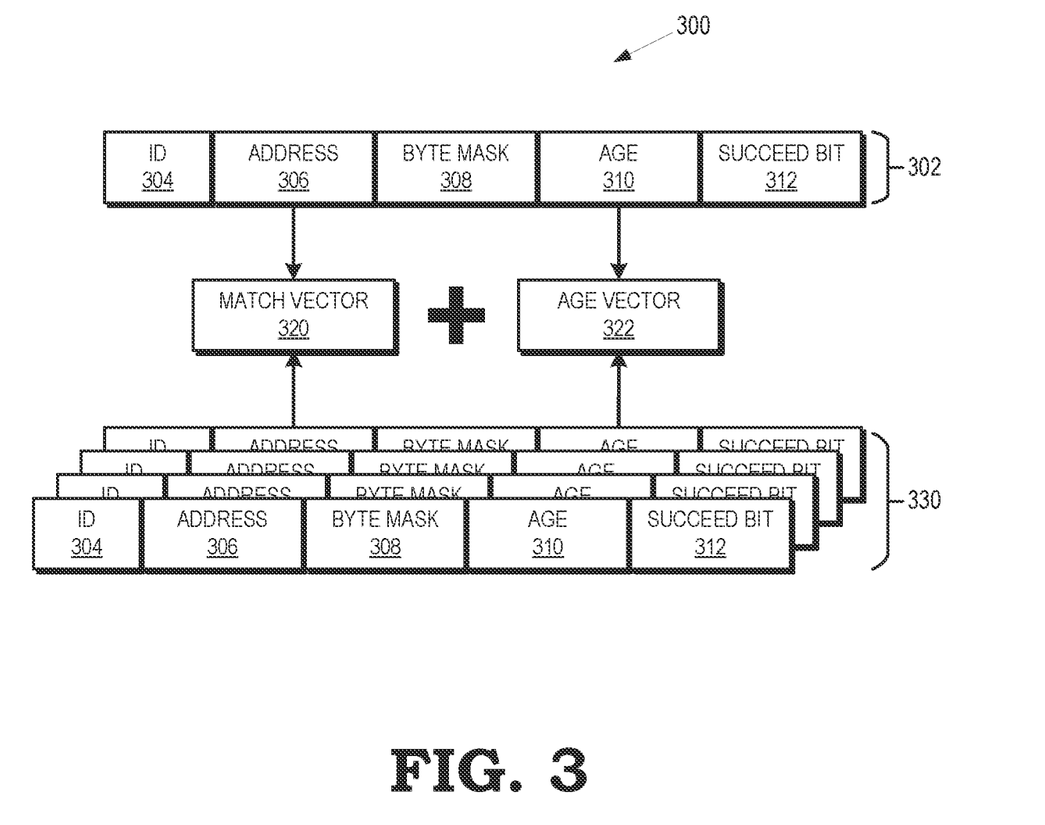
FIG. 3 is a block diagram illustrating a broadcast following a successful store commit from a store coalescing buffer to other entries of store coalescing buffers in the processing system to ensure that older store commits do not overwrite younger store commits in accordance with some implementations.

FIG. 3 is a block diagram 300 illustrating a broadcast 302 following a successful store commit from a store coalescing buffer to other entries 330 of store coalescing buffers in the processing system to ensure that older store commits do not overwrite younger store commits in accordance with some implementations. Each entry of the SCB 130 includes a byte mask 308 indicating which bytes of a cache line will be modified when the entry is written to the data cache. For example, in some implementations, the byte mask 308 includes a bit for each byte of the corresponding cache line, in which a 0 indicates that the corresponding byte will not be modified by the write operation of the entry and a 1 indicates that the corresponding byte will be modified by the write operation of the entry.

In some implementations, as stores are moved out of the store queue 128 into the SCB 130, the store commit logic circuitry 132 tracks which SCB entries match each other (i.e., are writing to the same cache line in the data cache) with a match vector 320. The store commit logic circuitry 132 also tracks the ages of the entries of the SCB 130 by maintaining an age vector 322 indicating the relative ages of matching entries.

At the end of the write pipeline, when an entry of the SCB 130 successfully completes its write operation to the data cache, in some implementations the store commit logic circuitry 132 sends a broadcast 302 of a valid bit (not shown), the ID 304, address 306, byte mask 308, age 310, and succeed bit 312 to other entries of the SCB 130. The store commit logic circuitry 132 performs an AND of the match vector 320 and the age vector 322 for each of the pending entries 330 and the broadcast 302 of the successful entry. For any pending entries 330 that match the successful entry and that are older than the successful entry, the store commit logic circuitry 132 clears the byte enables for any bytes matching the byte mask 308 of the younger successful entry. The store commit logic circuitry 132 thus ensures that any bytes that were written by the younger successful entry will not be overwritten by an older pending entry of the SCB 130.

In other implementations, instead of clearing the byte enables for bytes matching the byte mask 308 of a younger successful entry, the store commit logic circuitry 132 disallows (cancels) out-of-order writes for younger SCB entries that match any older SCBs that have not yet successfully written to the data cache. Non-matching out-of-order writes are still allowed to proceed.

Figure 4:
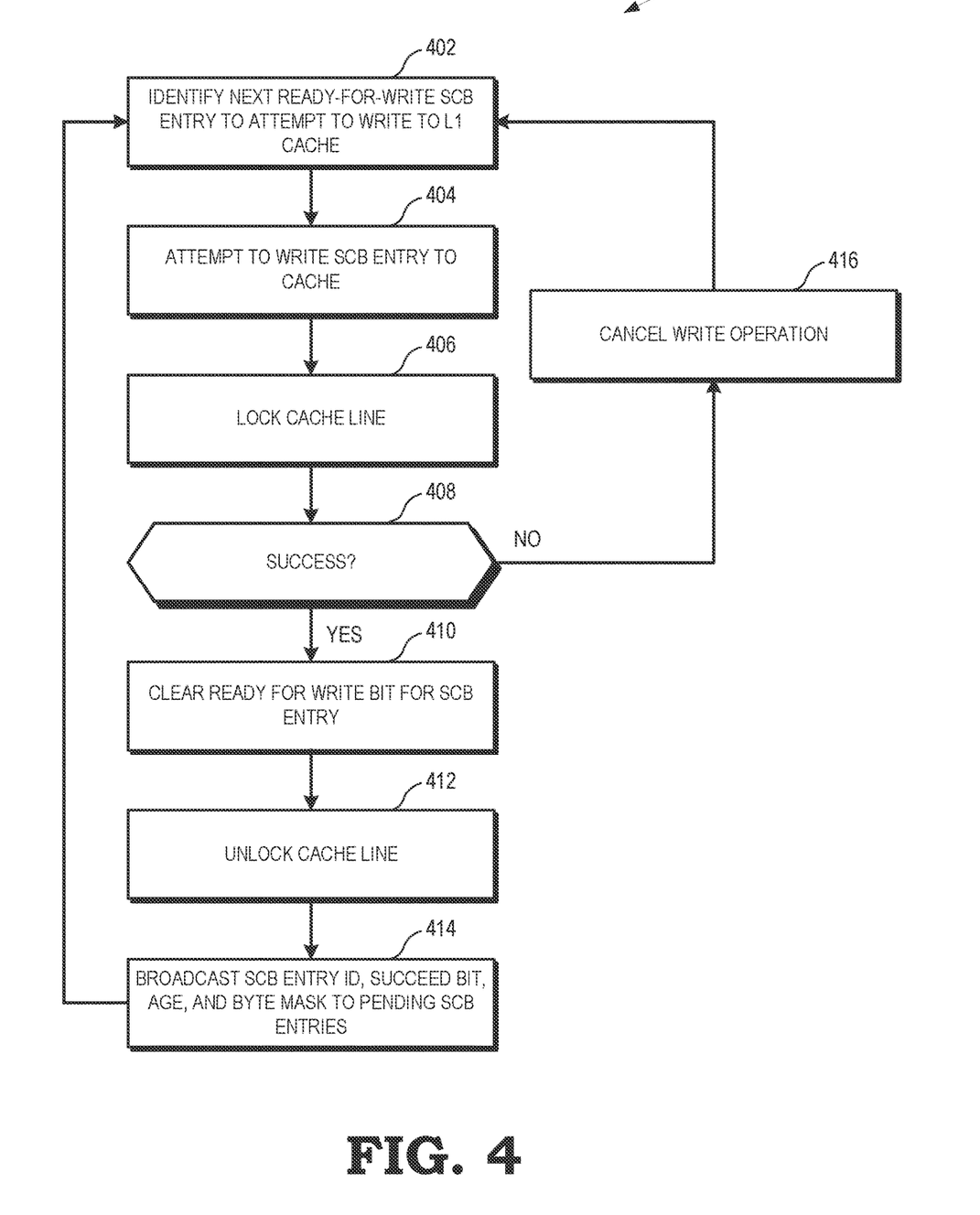
FIG. 4 is a flow diagram illustrating a method for performing pseudo out-of-order store commits in accordance with some implementations.

FIG. 4 is a flow diagram illustrating a method 400 for performing pseudo out-of-order store commits in accordance with some implementations. For ease of discussion, the method 400 is described with respect to an example implementation at the processing system 100 of FIG. 1.

At block 402, the store commit logic circuitry 132 identifies next entry of the SCB 130 that is ready for write and the cache line of the L1 cache 104 to which the next entry will attempt to write. At block 404, the store commit logic circuitry 132 attempts to write the SCB entry to the cache. At block 406, the store commit logic circuitry 132 locks the corresponding cache line in an exclusive state so that any probes to the cache line while the cache line is locked will be ignored, or NACK'd. In some implementations, the store commit logic circuitry 132 locks the cache line in an exclusive state by setting a bit in the SCB 130 indicating that the cache line is locked.

At block 408, the store commit logic circuitry 132 determines if the write operation was successful or if the write operation was blocked, such as by a bank conflict. If, at block 408, the store commit logic circuitry 132 determines that the write operation was successful, the method flow continues to block 410. At block 410, the store commit logic circuitry 132 clears the ready for write bit for the SCB entry to indicate that the SCB entry no longer needs to be written to the cache. At block 412, the store commit logic circuitry 132 unlocks the cache line by, e.g., deallocating the cache line. In some implementations, the store commit logic circuitry 132 sets a succeed bit in response to the write operation of the entry completing to prevent overwriting younger data with older data. At block 414, the store commit logic circuitry 132 broadcasts the ID, succeed bit, age, byte mask, and valid bit for the SCB entry that successfully completed its write operation to the pending entries of the one or more SCBs 130. The method flow then continues back to block 402 for the next SCB entry.

If, at block 408, the write operation was blocked, the method flow continues to block 416. At block 416, the store commit logic circuitry 132 cancels the write operation for the entry. In some implementations, the store commit logic circuitry 132 sets a bit for the entry indicating that the entry still needs to be written to the data cache so the write operation can be retried. The method flow then continues back to block 402, where the write operation will be retried, possibly after one or more younger SCB entries attempt to write to the data cache.

Figure 5:
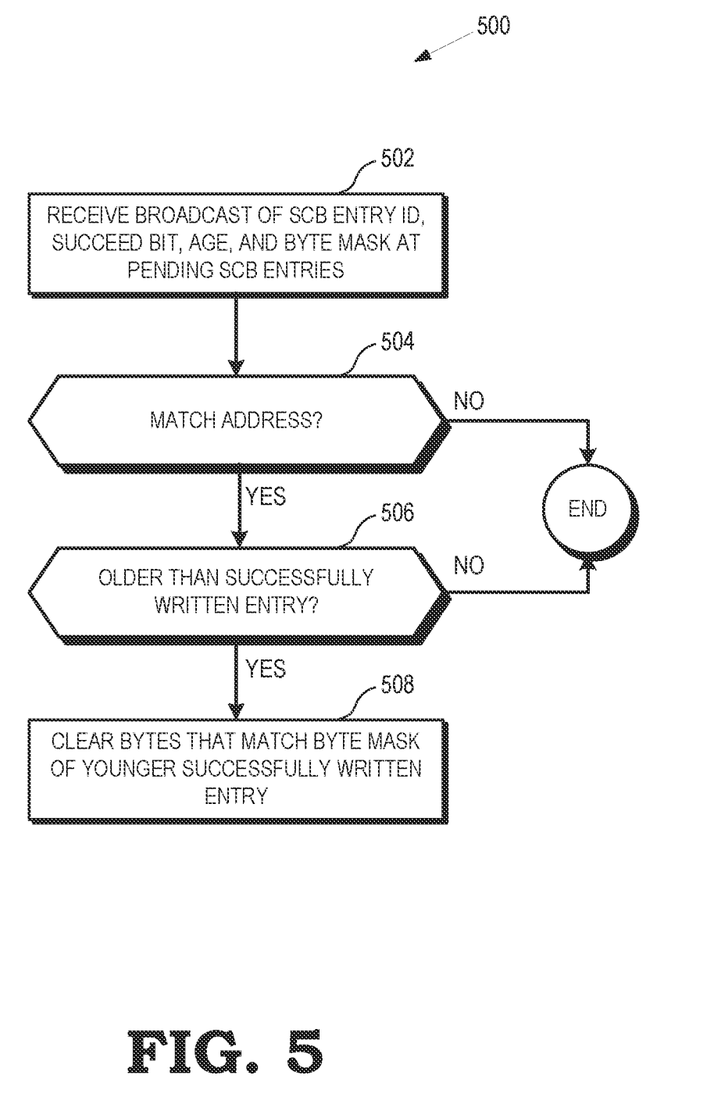
FIG. 5 is a flow diagram illustrating a method for clearing bytes from a byte mask of an older pending SCB entry following a successful write operation for a younger SCB entry to the data cache in accordance with some implementations.

FIG. 5 is a flow diagram illustrating a method 500 for clearing bytes from a byte mask of an older SCB entry following a successful write operation for a younger SCB entry to the data cache in accordance with some implementations. For ease of discussion, the method 500 is described with respect to an example implementation at the processing system 100 of FIG. 1.

At block 502, the pending SCB entries receive the broadcast of the ID, succeed bit, age, byte mask, and valid bit for the SCB entry that successfully completed its write operation. The pending SCB entries compare their addresses and ages to the broadcast. At block 504, the store commit logic circuitry 132 determines if the address of any pending SCB entry matches the address of the SCB entry that successfully completed its write operation. If, at block 504, the store commit logic circuitry 132 determines that no pending SCB entry matches the address of the SCB entry that successfully completed its write operation, the method flow ends.

If, at block 504, the store commit logic circuitry 132 determines that the address of a pending SCB entry matches the address of the SCB entry that successfully completed its write operation, the method flow continues to block 506. At block 506, the store commit logic circuitry 132 determines if the matching pending SCB entry is older than the SCB entry that successfully completed its write operation. In some implementations, the store commit logic circuitry 132 inspects the age vector between the matching pending SCB entry and the SCB entry that successfully completed its write operation to determine if the pending SCB entry is older.

If, at block 506, the store commit logic circuitry 132 determines that the matching pending SCB entry is younger than the SCB entry that successfully completed its write operation, the method flow ends, and the pending SCB entry remains in the SCB 130 until it attempts to write to the data cache. If, at block 506, the store commit logic circuitry 132 determines that the matching pending SCB entry is older than the SCB entry that successfully completed its write operation, the method flow continues to block 508.

At block 508, the store commit logic circuitry 132 clears the bytes of the byte mask 308 of the older pending SCB entry that match the bytes of the byte mask 308 of the younger SCB entry that successfully completed its write operation so that the older pending SCB entry is unable to overwrite the write operation of the younger entry.

In some implementations, the apparatus and techniques described above are implemented in a system including one or more integrated circuit (IC) devices (also referred to as integrated circuit packages or microchips), such as the processing system described above with reference to FIGS. 1-5. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some implementations, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific implementations. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific implementations. However, the benefits, advantages, solutions to problems, and any feature(s) that may cause any benefit, advantage, or solution to occur or become more pronounced are not to be construed as a critical, required, or essential feature of any or all the claims. Moreover, the particular implementations disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular implementations disclosed above may be altered or modified and all such variations are considered within the scope of the disclosed subject matter. Accordingly, the protection sought herein is as set forth in the claims below.

What is claimed is:

1. A method, comprising:
locking a cache line of a cache of a processing system in an exclusive state while attempting a first write operation of first data from a first entry of a buffer to the cache line of the cache;
subsequent to locking the cache line, canceling the first write operation;
in response canceling the first write operation, indicating that the first data needs to be written to the cache;
retrying the first write operation until the first write operation has successfully completed; and
unlocking the cache line in response to successfully completing the first write operation.

2. The method of claim 1, wherein locking comprises setting a bit in the buffer indicating that the cache line is locked.

3. The method of claim 1, further comprising:
negatively acknowledging a probe to the cache line at the buffer in response to the cache line being locked.

4. The method of claim 1, wherein:
indicating that the first data needs to be written to the cache comprises setting a bit for the first data, and
retrying the first write operation of the first data is performed in response to the bit being set.

5. The method of claim 1, further comprising:
attempting a second write operation of second data from a second entry of the buffer to the cache before successfully completing the first write operation.

6. The method of claim 4, further comprising
clearing the bit and deallocating the first entry of the buffer in response to successfully completing the first write operation.

7. The method of claim 1, further comprising:
in response to successfully completing the first write operation, setting a succeed bit for the first write operation; and
broadcasting, to the processing system, the succeed bit, an identifier indicating an address of the first data, an age of the first write operation, and a byte mask associated with the first write operation to pending entries in the buffer.

8. The method of claim 7, further comprising:
clearing bytes matching the byte mask associated with the first write operation from a byte mask associated with a broadcast of a successful write operation of a pending entry of the buffer having an address matching the address of the first data and an age younger than the age of the first write operation.

9. The method of claim 1, further comprising:
canceling a second write operation of second data to the cache in response to the first write operation having an age older than the age of the second write operation, wherein an address of the second data matches an address of the first data.

10. A method, comprising:
selectively performing out of order write operations of entries of a buffer to a cache of a processing system;
locking a cache line of the cache in an exclusive state while attempting a first write operation of first data from a first entry of the buffer to the cache;
subsequent to locking the cache line, receiving an indication of a cancelation of the first write operation;
in response to the cancelation of the first write operation, setting a bit indicating that the first data needs to be written to the cache; and
in response to the bit being set, retrying the first write operation until the first write operation has successfully completed.

11. The method of claim 10, further comprising:
unlocking the cache line in response to successfully completing the first write operation.

12. The method of claim 10, further comprising:
negatively acknowledging a probe to the cache line at the buffer in response to the cache line being locked.

13. The method of claim 10, wherein selectively performing out of order write operations comprises:
attempting a second write operation of second data from a second entry of the buffer to the cache before successfully completing the first write operation.

14. The method of claim 10, further comprising:
clearing the bit and deallocating the first entry of the buffer in response to successfully completing the first write operation.

15. The method of claim 10, further comprising:
in response to successfully completing the first write operation, broadcasting to the processing system an identifier indicating an address of the first data, an age of the first write operation, and a byte mask associated with the first write operation to pending entries in the buffer.

16. The method of claim 15, further comprising:
clearing bytes matching the byte mask associated with the first write operation from a byte mask associated with a broadcast of a successful write operation of a pending entry of the buffer having an address matching the address of the first data and an age younger than the age of the first write operation.

17. The method of claim 10, further comprising:
canceling a second write operation of second data in response to the first write operation having an age older than the age of the second write operation, wherein an address of the second data matches an address of the first data.

18. A processing system, comprising:
a processor,
a cache; and
a buffer comprising logic circuitry to:
selectively perform out of order write operations of entries of the buffer to the cache;
lock a cache line of the cache in an exclusive state while attempting a first write operation of first data from a first entry of the buffer to the cache;
subsequent to locking the cache line, cancel the first write operation;
in response to canceling the first write operation, indicate that the first data needs to be written to the cache;
retry the first write operation until the first write operation has successfully completed; and
unlock the cache line in response to successfully completing the first write operation.

19. The processing system of claim 18, wherein the logic circuitry is further to:
attempt a second write operation of second data from a second entry of the buffer to the cache before successfully completing the first write operation.

20. The processing system of claim 18, wherein the logic circuitry is further to:
negatively acknowledge a probe to the cache line at the buffer in response to the cache line being locked.

* * * * *